Figure 2:
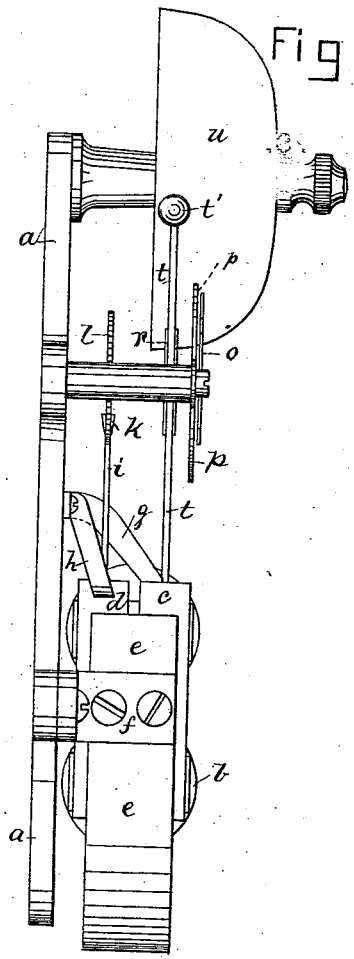

(Model.)

G. L. ANDERS.
Telephone Signal Apparatus.

No. 240,070.     Patented April 12, 1881.

Witnesses
L. F. Connor
Arthur Reynolds

Inventor
George L. Anders,
by Crosby & Gregory
Attys.

UNITED STATES PATENT OFFICE.

GEORGE LEE ANDERS, OF BOSTON, MASSACHUSETTS, ASSIGNOR TO AMERICAN BELL TELEPHONE COMPANY, OF SAME PLACE.

TELEPHONE-SIGNAL APPARATUS.

SPECIFICATION forming part of Letters Patent No. 240,070, dated April 12, 1881.

Application filed January 17, 1881. (Model.)

*To all whom it may concern:*

Be it known that I, GEORGE LEE ANDERS, of Boston, county of Suffolk, State of Massachusetts, have invented an Improvement in Telephone-Signal Apparatus, of which the following description, in connection with the accompanying drawings, is a specification.

My invention relates to an individual signal apparatus for telephone-circuits.

In one class of signal apparatus, which has appeared under various modifications, a series of signal-controlling devices at the different stations on the circuit are moved simultaneously by electric impulses, they all advancing one step when an electric current of a certain character is thrown on the line, and each of the signal-controlling devices, after a certain number of these steps, is brought into position to allow its signal to operate, the number of steps by which the devices are brought into operative position being different for each instrument of the series. It frequently happens that some one of the controlling devices fails to move for one step with the others, or "skips" a step, so that its number of movements is less than the number of impulses, and consequently the controlling device at some stations may be in position to give a signal at the wrong time, and a false signal thus be given at such stations, or the device at the station to be called may be out of its proper position relative to the operator's instrument, so that the signal will not be given at all.

My present invention has for its object to obviate this defect; and it consists, mainly, in so constructing the actuating mechanism for the signal-controlling devices that several short steps are necessary to move the said devices from the position in which one of the signals is permitted to operate to the position in which the next one is permitted to operate, so that if one of the devices should skip one or two steps it would not throw its signal-controlling device far enough out of proper position relative to the others to cause a false signal to be given. The controlling devices instead of being, as heretofore, moved by a single sudden movement from the position at which one of them is to be operated to that at which the next one of the series is operated, receive an apparently continuous movement, passing through the spaces at which each is operated until they arrive at the position to cause the proper one of the signals to sound, when the operator will cease sending the impelling electric impulses, and the controlling devices will stop moving and the desired one of the signals may be sounded. The moving signal-controlling devices have pointers connected therewith, which show their position at any time, and enable the operator to know just when to stop their movement.

In apparatus of this kind hitherto in use great care was needed in manipulating the key by which the electric impulses were sent, so that single sharp definite impulses should be given; but in the present apparatus, when the impulses are given by breaking and closing a circuit by a key, no especial care need be taken by the operator, who rapidly vibrates the said key until the hand or pointer, in its apparently continuous movement, arrives at the desired position. If any skips or false movements are made, there is very little chance that all or more than one of them occur in the same instrument, and they will accordingly not affect the proper operation of the instruments, as in order to do this several such skips would have to take place in a single instrument. These short movements may be made by the rapid impulses caused by a magneto-generator; and I have devised a form of mechanism adapted to be actuated by the vibrations of a light armature caused by such magneto-currents.

In the form of instrument herein shown an electro-magnet is provided with two polarized armatures, each acted upon by a spring, as shown in the application filed by me October 5, 1880, in such manner that one of them is vibrated and the other held stationary by currents of one polarity, and the former held stationary and the latter vibrated by currents of the other polarity. One of the armatures is used to set the signal-controlling device in the proper position, after which currents of the opposite polarity will vibrate the other armature, which is provided with a bell-hammer to strike a bell in this movement. The bell-hammers, in all but one of the instruments, will be prevented from reaching the bell by their controlling devices, which are shown as disks properly located to impede the movement of the bell-hammer arm, except at a portion of their periphery where they are not cut away or notched, and when, in the rotation of these disks, the notched portion is opposite the hammer-arm the said arm has its full movement up to the bell. The said notch occupies such a portion of the periphery of the disk that some portion of it will remain opposite the bell-hammer during the movement caused by several vibrations of the actuating-armature. The points marked on the dial to direct the operator in stopping the movement of the said controlling-disks are so placed that if the instruments all move exactly alike the middle of a notch will be opposite the bell-hammer on one of the instruments when the pointer of the operator's instrument is opposite to the corresponding point of the disk, and even if one of the said instruments should have skipped one or two movements some portion of the said notch would be opposite the bell-hammer, so that it would ring, as desired.

In short, the principle of the invention consists in so making the apparatus that if the general or average movement of all the signal-controlling devices is the same (a thing easily accomplished) the signal will operate properly, while in the apparatus hitherto employed an exact uniformity of movement is required, and they consequently frequently fail.

Figure 1:
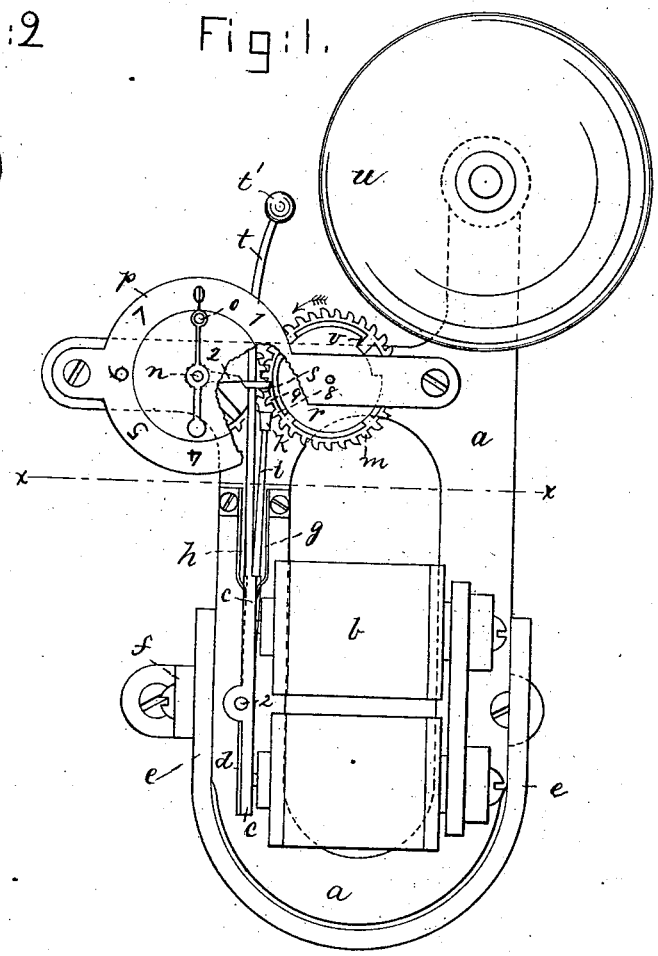
Figure 3:
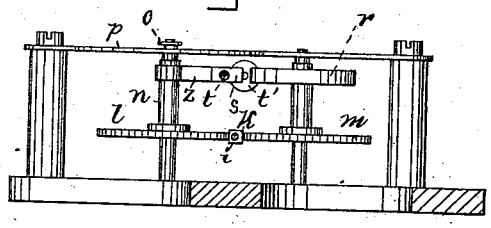

Figure 1 is a front elevation of a signal apparatus embodying my invention; Fig. 2, a side elevation thereof; Fig. 3, a sectional view on line $x\,x$, Fig. 1; and Fig. 4 is a modification to be referred to.

The frame-work $a$, of suitable form to sustain the working parts, supports at its lower end the actuating electro-magnet $b$, provided with two armatures, $c\,d$, pivoted at 2 between the poles of the said magnet, and both polarized with the same polarity by the permanent magnet $e$, supported on the lug $f$ connected with the frame-work $a$, and surrounding the electro-magnet. The said armatures $c\,d$ are acted upon by retracting or actuating springs $g\,h$ bearing on the adjacent ends of the said armatures, the one, $g$, pressing the end of the armature $c$ away from the adjacent pole of the magnet $b$, while the spring $h$ presses the end of the armature $d$ toward the same pole of the said magnet $b$. By this arrangement currents of the proper polarity to cause the magnet $b$ to attract the spring-pressed end of the said armatures and repel the other end will cause the armature $c$ to vibrate on the pivot 2, the magnetic force overcoming the spring $g$, while no movement can take place with the armature $d$, since it is already held by its spring $h$ in the position which the magnetic force tends to cause it to assume. Currents of opposite polarity, for a like reason, will cause the armature $d$ to vibrate while the one, $c$, remains stationary. In either case when the current is removed the retracting-spring which has yielded to permit a movement of its armature will restore the said armature to the position it occupied before the said current was thrown on, so that by sending a series of impulses, or an intermittent current of one polarity, a continuous vibration would be imparted to one of the armatures, while a series of impulses of other polarity will cause a vibratory movement in the other of the said armatures.

The armature $d$, which may be called the "actuating-armature," is provided with an arm, $i$, carrying at its end a small block or striker, $k$, placed between the toothed wheels $l\,m$, having an equal number of teeth meshing with one another in such position that the vibrations of the said armature $d$ cause the striker $k$ to strike first a tooth of one of the said wheels, giving a slight movement, and then a tooth of the other of the said wheels, causing a further movement, so that each backward and forward movement of the armature $d$ causes the said wheels to move the distance of one tooth in the direction of the arrow thereon. This operation is clearly shown in Fig. 4, where the striker $k$ is shown at the end of its movement toward the wheel $l$, in which movement it first struck the point of the tooth 4, causing the wheel $l$ to turn until the said striker became locked between the teeth 4 and 5 thereof, as shown in full lines, in which movement the point of the tooth 6 of the wheel $m$ is brought into position to be struck by the striker $k$ in its return movement toward the said wheel $m$, in which it will move the said wheel $m$ until the tooth 7 thereof engages the top of the striker $k$, bringing the tooth 5 of wheel $l$ into position to be struck by the said striker in its next vibration.

Figure 4:
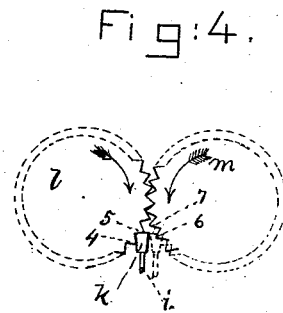

The teeth of the wheels $l\,m$ are shown in Fig. 4 as pointed in shape, this form being preferable, to be used in connection with the vibrating striker $k$, but ordinary gear-wheels can be used, as shown in Fig. 1, the sides of the teeth engaged by the side of the striker $k$ being slightly rounded, as shown. This form of actuating mechanism is very certain in its movement. The wheels $l\,m$ respond to extremely rapid vibrations of the striker $k$, and are never carried too far by their momentum, as they are positively stopped at the end of each of the said vibrations by the engagement of the teeth with the top of the said striker, as shown in Fig. 4.

The arbor $n$ of the wheel $l$ is provided with a pointer, $o$, which indicates the movement of the said wheels, it being used in connection with a dial, $p$, divided into numbered spaces corresponding to the position of the wheels at which each instrument in the series is to operate.

The arbor of the wheel $m$ carries the signal-controlling disk $r$, the main portion of the periphery of which forms an obstacle for the projection $s$ on the bell-hammer arm $t$, connected with the signal-operating armature $c$, so that when the said armature $c$ is vibrated the bell-hammer $t'$ is not permitted to reach the bell to ring the signal thereon.

A portion of the periphery of the disk $r$ is removed, as shown at $v$, for a space measuring in degrees on the circumference the space in degrees on the periphery of the wheels $l\ m$ occupied by several teeth—in this instance four. When, in the rotary movement of the wheels $l\ m$, the notch $v$ of the controlling-disk $r$ is brought opposite the projection $s$ on the hammer-arm $t$, the bell-hammer $t'$ in its vibration will be permitted to strike the bell.

The spaces between the figures of the dial $p$, measured in degrees, are equal to the arc occupied by the notch $v$ in the disks, and are so arranged in the different instruments of the series that when starting with their pointers all at zero, if they all move equally the middle point of the notch of the first instrument will be opposite the projection $s$ when the pointers are opposite the figure 1 of the dial, and the middle point of the notch of the second instrument will be opposite the said projection $s$ when the pointers are at figure 2, and so on.

A stop-arm, $z$, on the arbor $n$ of the wheel $l$ is brought, in the rotation of the said wheel, caused by the armature $d$, into engagement with the projection $s$ on the hammer-arm $t$ in Fig. 1, the said hammer-arm $t$ being held by the force of the spring $g$ as near to the arbor $n$ as possible while the armature $d$ is in vibration. When the stop-arm $z$ engages the said projection $s$ it arrests the movement of the wheels $l\ m$, the striker $k$ engaging the said teeth without moving them; but any wheels which may have skipped one or more movements and thus fallen behind the others, will be urged forward until their stop-arms $z$ have engaged the projection $s$, so that by a continued movement of the armature $d$ the instruments will all be brought to the position in which the said stop-arm is engaged, this position forming the common starting-point of all the instruments, their pointers then being at zero, as shown in Fig. 1. When the wheels are thus all brought in unison, or to a common starting-point, the stop-arms $z$ are disengaged by vibrating the armature $c$ and connected hammer-arm $t$, the periphery of the disk $r$ allowing sufficient movement for the disengagement of the projection $s$ from the arm $z$ without, however, permitting the hammer $t'$ to reach the bell $u$. The said stop-arm is placed in such position relative to the teeth of the wheels $l\ m$, as shown in Fig. 1, that when engaged by the projection $s$ the striker $k$ will have completed its impulse on the wheel $l$ caused by the attraction of the magnet $b$, and will be in position to impel the tooth 8 of the wheel $m$ by the action of its spring $h$, and by the attraction of the magnet $b$ when its polarity is reversed, to operate the armature $c$ and remove the projection $s$ from the said arm $z$, so that the moment the said projection is thus removed the wheels $l\ m$ and arm $z$ will be moved forward until the tooth 9 rests on the top of the said striker, and in this movement the arm $z$ will pass by the projection $s$, so that it cannot again be engaged thereby till the wheels $l\ m$ have made another entire revolution.

The operation is as follows: After the instruments have been brought to a unison by the continued operation of the armature $d$ and then released by one or more movements of the armature $c$, as just described, the operator sends a series of impulses of the proper polarity to actuate the armature $d$, and watches the pointer O of his instrument until it arrives at the figure on the dial corresponding to the station it is desired to signal, when the current is reversed and the armatures $c$ are set in vibration, while the armatures $d$ remain motionless, with the striker $k$ locked between two teeth of the wheel $m$, as shown in dotted lines, Fig. 4. The bell-hammer at the station it is desired to signal will be permitted by the notch $v$, now opposite it, to reach the bell, while those at the other stations will be stopped by the unnotched portion of the disks $r$. If the operator's instrument has skipped a movement, the others which have not skipped will be ahead of it by the space of one tooth of the wheels $l\ m$. In this case the middle point of the notch $o$ will have passed the projection $s$ of the signal it is desired to sound; but the whole of the said notch will not have passed the said projection, so that the signal will operate properly, while the notch of the next instrument of the series will not have advanced enough to permit its bell to ring, as the notch of a succeeding instrument does not come to its operative position until the one of the preceding instrument has wholly passed. If the instrument at the station it was desired to call, or at the following station, had made less movements than the operator's, the signal would nevertheless operate properly, while in an apparatus requiring exact unison the above-described false movements would have caused the station in advance of the desired one alone to operate, (when the operator's instrument skipped,) or no signal at all to be given, or two stations to be signaled at the same time, according to the instrument in which the false movement took place.

The armatures $c\ d$ may be operated by magneto-electric currents generated by a machine such as described in my application filed April 12, 1880, to which reference may be had; or, if desired, the hammer-armature $c$, or both armatures, may be automatically vibrated by placing them and back contact-circuit-closing springs in circuit with the actuating-magnet $b$. In this case the armature, when stationary, under the action of its actuating spring $g$ or $h$, would retain the circuit closed, and the movement of the armature $c$, permitted by the unnotched portion of the disk $r$, should not be sufficient to disconnect it from its back contact-circuit-closing spring.

It is obvious that any other mechanism for actuating the controlling-disk $r$ might be employed—as, for example, a device similar to an anchor-escapement, the pallets being connected with the arm $i$ of the armature $d$, and acting alternately on the opposite sides of a single escape-wheel, which would carry the controlling-disk, pointer, and stop-arm.

The polarizing-magnet $e$ might be so arranged relative to the armatures $c\,d$ as to give them opposite polarity, in which case the retracting-springs, if at adjacent ends of the said armatures, would be on the same sides thereof, the essential point being that a magnetic force of either polarity in the electro-magnet $b$ shall act with the spring of one armature and in opposition to the spring of the other armature.

The striker $k$, by the engagement of its top portion, might be employed to regulate the movement or escape of the teeth of the wheels $l\,m$ when impelled by another force, as that of a weight or spring.

I claim—

1. In a telephone-signal apparatus, the actuating electro-magnet and its armature, combined with the signal-controlling mechanism moved thereby, and constructed as described, to prevent the sounding of the signal during the greater part of its movement, and to allow the said signal to sound when stopped at any point during a certain portion of its movement, caused by two or more vibrations of its armature, substantially as and for the purpose described.

2. The actuating electro-magnet, combined with two polarized armatures and actuating-springs therefor, arranged on opposite sides of the said armature relative to the action of magnetic force between them and the said magnet, whereby currents of one polarity cause movements in one only of the armatures, and currents of the other polarity cause movements in the other one only of the said armatures, substantially as and for the purpose described.

3. The toothed wheels meshing with one another, combined with the striker $k$, arranged to vibrate between the said wheels, to engage a tooth of each wheel alternately and stop the movement thereof until the said striker is vibrated into engagement with the other wheel, when a movement equal to the space of half a tooth takes place, substantially as described.

4. In a telephone signal apparatus, the actuating electro-magnet and two polarized armatures therefor, adapted to be moved by currents of opposite polarity, and the signal-controlling disk, actuated by one of the said armatures, and the stop-arm connected therewith, combined with the bell-hammer, actuated by the other armature, and projection connected therewith in position to engage the said stop-arm, substantially as described.

In testimony whereof I have signed my name to this specification in the presence of two subscribing witnesses.

GEORGE LEE ANDERS.

Witnesses:
 JOS. P. LIVERMORE,
 ARTHUR REYNOLDS.